J. R. SPENCER.
BABY AUTO.
APPLICATION FILED FEB. 25, 1909.
942,679.
Patented Dec. 7, 1909.
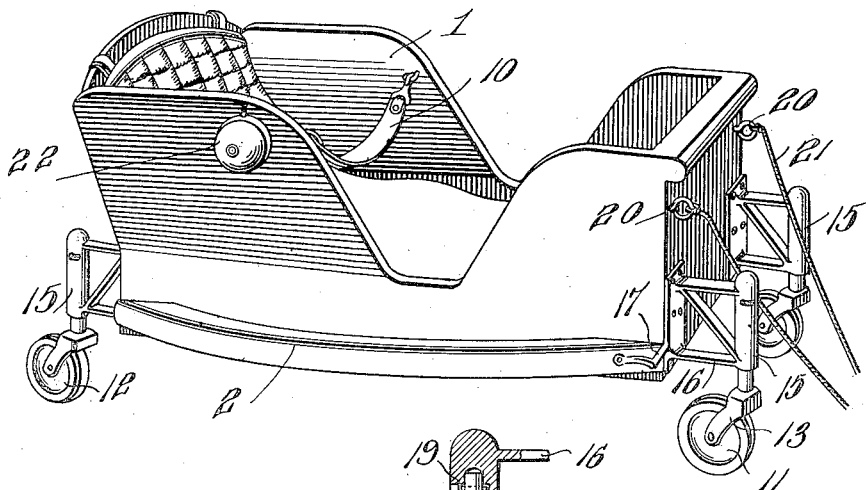
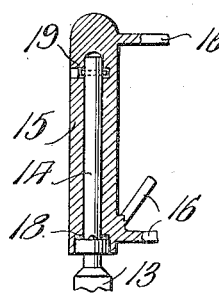
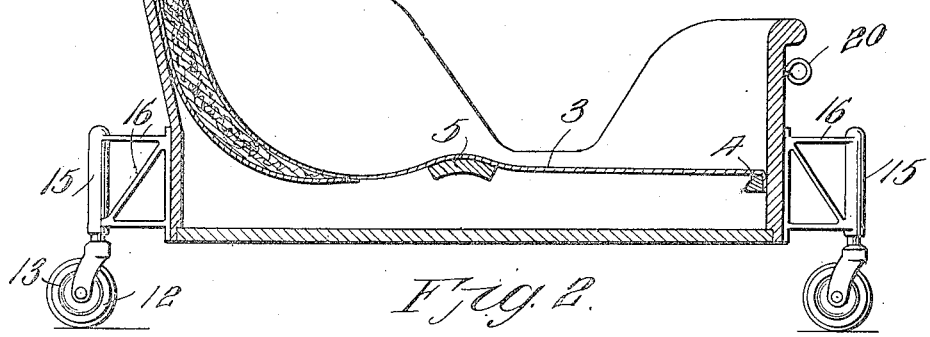
Witnesses
Frank Hough
Inventor
John R. Spencer,
By Victor J. Evans
Attorney

UNITED STATES PATENT OFFICE.

JOHN R. SPENCER, OF BARTOW, FLORIDA.

BABY-AUTO.

942,679. Specification of Letters Patent. Patented Dec. 7, 1909.

Application filed February 25, 1909. Serial No. 479,856.

*To all whom it may concern:*

Be it known that I, JOHN R. SPENCER, a citizen of the United States of America, residing at Bartow, in the county of Polk and State of Florida, have invented new and useful Improvements in Baby-Autos, of which the following is a specification.

This invention relates to baby autos, so called, and one of the principal objects of the same is to provide a wheeled vehicle in miniature representation of an automobile for use by children which shall be safe, easy to operate and amusing to the occupant.

Another object of the invention is to provide a small vehicle in representation of an automobile which cannot readily be overturned, which shall be mounted on small caster wheels and provided with rubber-surface guards to prevent injury to the occupant.

Still another object of the invention is to provide a device of the character referred to which shall be provided in great part with rounded corners to prevent injury, which will be elevated but slightly from the floor or ground and which will be provided with ball bearing caster wheels and a swinging seat.

These and other objects may be attained by means of the construction illustrated in the accompanying drawing, in which,—

Figure 1 is a perspective view of the vehicle made in accordance with my invention. Fig. 2 is a longitudinal section of the same. Fig. 3 is a detail sectional view of one of the ball bearings for the wheels.

Referring to the drawing, the numeral 1 designates the body of the wagon which is preferably made of wood and highly finished in imitation of the body portion of an automobile. At the sides near the bottom portion of the body 1 guard rails 2 are provided, said guard rails being preferably covered with rubber to prevent injury to an occupant of the wagon and to prevent marring the furniture when used in a house.

The seat comprises a strip of canvas 3 secured near the front of the wagon by means of a cross bar 4 and extending from thence backward over a curved support 5 and provided with an upholstered portion 6 having straps 7 secured thereto. The straps 7 pass through eyes or brackets 8 near the top of the back portion of the body, and buckles 9 are provided for adjusting the seat to the required position. A cross strap 10 is provided for holding the occupant in the wagon.

The four wheels upon which the wagon is mounted are substantially identical, and hence a description of one will serve as a description for all. The wheels 11 are preferably of quite small diameter and are fitted with rubber tires 12, said rubber tires being secured in grooves extending around the periphery of the wheels. The wheels are each journaled in a yoke 13 provided with a shank 14, and the bearing 15 for said shank is connected to the body 1 of the wagon by means of a skeleton frame 16. A brace 17 formed on the frame 16 extends at the side of the body and is secured to the guard or fender 2, as shown more particularly in Fig. 1. The caster shank 14 is mounted on ball bearings 18, and near the upper end of the shank a pin 19 serves to hold the shank in the bearing. Screw eyes 20 secured to the front of the wagon have connected thereto a cord or rope 21 by means of which the wagon may be pulled over the floor or ground, if desired. A bell 22 may be connected to the side of the body.

From the foregoing it will be obvious that a wagon made in accordance with my invention can be used to amuse children, the wagon body being set close to the floor and provided with guards at the sides and rounded corners wherever possible and hence will not be liable to injure the occupant of the wagon in case if by some accident it should be overturned.

The device may be produced at comparatively slight cost, is attractive in appearance and can be turned almost within its length owing to the pivoted casters and is very efficient for its purpose.

I claim:—

1. A toy vehicle of the character described comprising a box or body, a seat comprising a strip of flexible material secured inside the body in front, a curved cross bar extending across the body, said seat having an upholstered portion and provided with supporting means to engage the back of the body to support said seat.

2. A toy vehicle comprising a body made in representation of an automobile body, skeleton frames extending outward from the front and back of said body, caster wheels mounted in the outer ends of said frames, curved guards secured to the lower edge of said body, and rubber strips secured to said guards.

In testimony whereof I affix my signature in presence of two witnesses.

JOHN R. SPENCER.

Witnesses:
  H. K. OLLIPHANT,
  H. K. OLLIPHANT, Jr.